Figure 1:
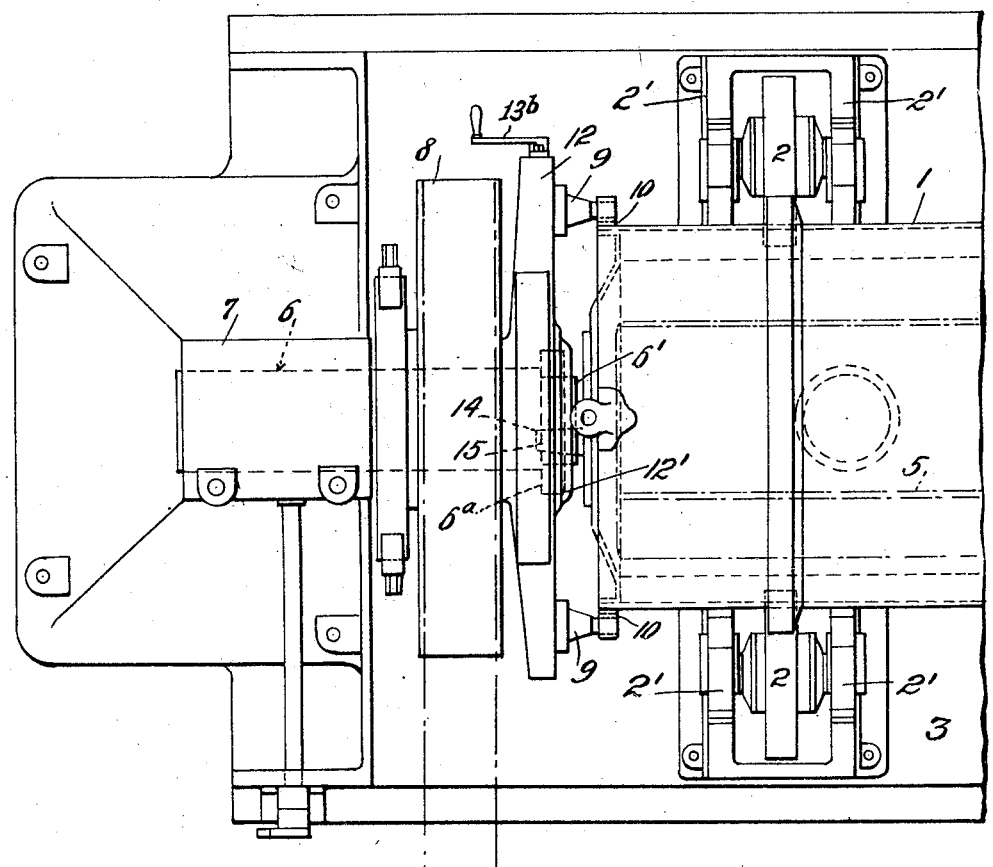

Oct. 27, 1931.  R. A. WHITSON  1,828,916
APPARATUS FOR MOLDING HOLLOW BODIES BY CENTRIFUGAL FORCE
Filed Jan. 7, 1929  2 Sheets-Sheet 1

INVENTOR
Ralph Alexander Whitson
BY
Joseph F. O'Brien
ATTORNEY

Oct. 27, 1931. R. A. WHITSON 1,828,916
APPARATUS FOR MOLDING HOLLOW BODIES BY CENTRIFUGAL FORCE
Filed Jan. 7, 1929 2 Sheets-Sheet 2
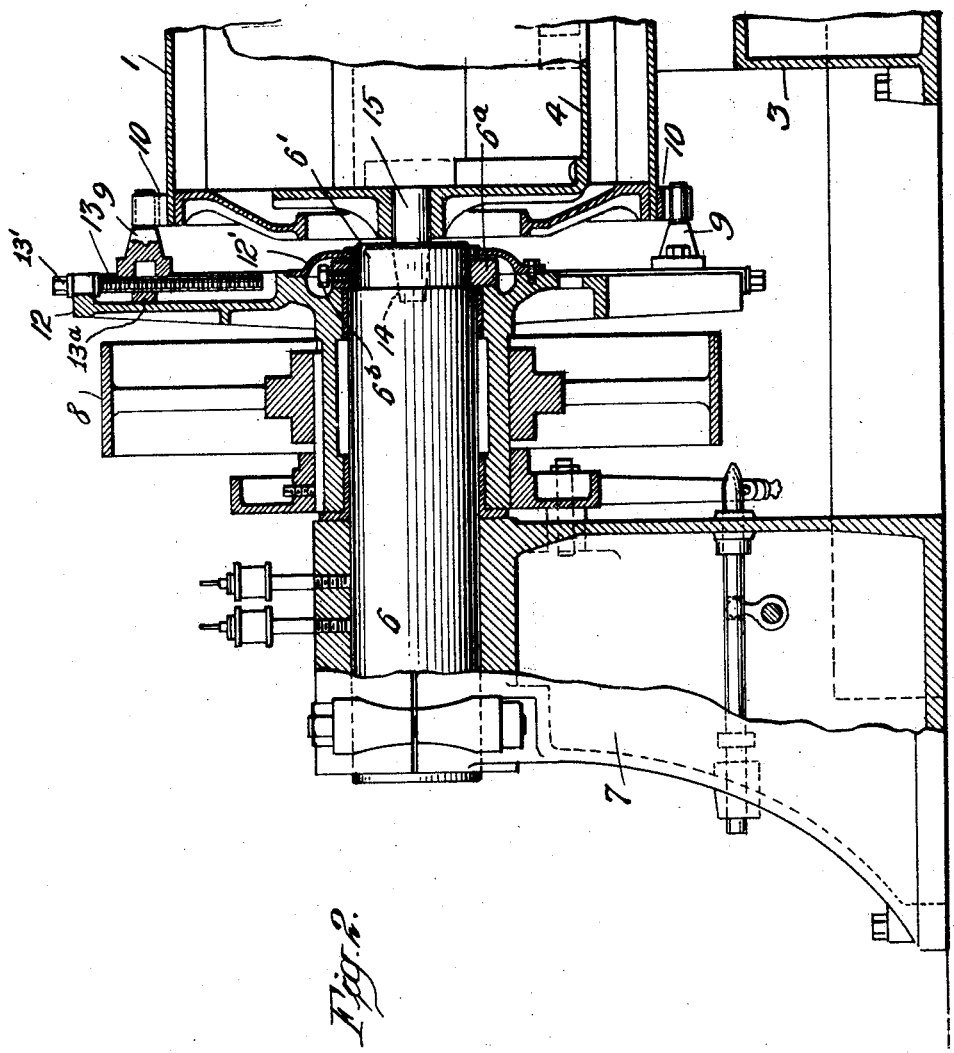

Patented Oct. 27, 1931

1,828,916

UNITED STATES PATENT OFFICE

RALPH ALEXANDER WHITSON, OF GLASGOW, SCOTLAND

APPARATUS FOR MOLDING HOLLOW BODIES BY CENTRIFUGAL FORCE

Application filed January 7, 1929, Serial No. 330,855, and in France January 10, 1928.

This invention relates to improvements in apparatus for molding, by centrifugal force, hollow bodies or plastic or cementitious materials, such as concrete pipes, and particularly to apparatus of the type which employs a rotatable mold, preferably supported and rotatable on rollers and combined with a material-feeding bucket capable of movement axially into and out of the mold and having a scraper operable by reverse rotary movement of the bucket.

One of the objects of this invention is the provision of improved means for driving the mold, whereby the mold and the driving element may be permitted to revolve with their axes out of alignment.

Another object of the invention is to provide, in an apparatus of the character specified, a driving element having a loose or floating coupling engagement with the mold, and embodying a loose or floating couple or clutch, one of the engaging members of which have free radial movement relative to the other to permit the mold and driving element to revolve with their axes out of alignment or registration.

Still another object of my invention is the provision in a driving apparatus for molds of the type specified, of a driving element rotatably mounted and preferably comprising a pulley having axially-disposed driving arms capable of radial movement into and out of engagement with the driven end of the mold.

Still another object of my invention is to provide a fixed shaft for mounting a driving element of the type hereinabove specified and to utilize said fixed shaft as a support for one end of the bucket.

Still another object of the invention is to produce a driving apparatus for molds of the type specified in which radial adjustment of the driving arms to engage and disengage the mold will be accomplished by means of a screw and nut mechanism adapted to positively move the driving arms into and out of contact with driven members comprising forks on the driven end of the mold, said forks preferably being formed integrally with the mold, the parts being arranged to permit the said driving and driven members to have radial relative movement and preferably to cause the driving arms to have sufficient movement within the said forks to permit the mold to revolve out of axial alignment with the driving element.

Still another object of the invention is to provide in a driving apparatus for a mold of the character described, a fixed shaft having a recess to receive the conventional pivot at the front end of the bucket so as to support and hold the bucket firmly in proper axial alignment during the scraping operation.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of an apparatus embodying my invention and showing my preferred method of driving a mold in accordance therewith; and Fig. 2 is a central vertical section through the driving means and mold of the apparatus shown in Fig. 1.

Referring now to these drawings, which illustrate a preferred embodiment of my invention, the apparatus shown comprises a mold 1 supported to rotate in a conventional manner and, as shown, having its rear end rotatably supported upon rollers 2 which may be mounted in any suitable manner and, as illustrated, are mounted in bearings 2' on a supporting structure 3.

A bucket 4 is mounted in a conventional manner at the opposite end of the mold to move in an axial direction into the mold for the purpose of introducing material into said mold, it being understood that said bucket is movable axially into and out of the mold to enable a charging of the bucket exterior of the mold and a dumping of the material within the mold.

This bucket 4 is provided with a scraper 5 which, in the conventional manner, is brought into scraping operation by a reverse rotary movement of the said bucket.

My present invention is particularly directed to the provision of improved means for driving the mold and supporting the bucket, and in the preferred form of my invention, the driving apparatus comprises a fixed shaft 6, rigidly mounted and fastened in a supporting bracket 7 preferably mounted on the supporting structure 3 for the mold. Rotatably mounted upon the shaft 6 is a driving element which, in the form shown, comprises a pulley 8 provided with axially-disposed driving members or coupling arms 9 arranged to contact and engage with driven members mounted on the driven end of the mold, the driven members in the form shown comprising coupling forks 10.

The driving coupling members or arms 9 and the driven coupling members or forks 10 are arranged to form a loose or floating couple so as to permit the mold 1 and the driving element or pulley 8 to revolve with their axes out of alignment.

As illustrated, the pulley 8 is driven by a belt 11a from a motor 11 but it is obvious that said pulley may be driven in any suitable manner and from any suitable source of power.

In the preferred form of apparatus shown, the pulley 8 carries a boss 12 on which the driving members or coupling arms 9 are mounted in a manner to permit movement thereof in a radial direction of the mold and thus to be thrown into or out of contact with the driven members or coupling forks 10, this adjustment preferably being effected by a screw and nut mechanism mounted in the boss 12 and comprising, as shown, a radially-disposed screw 13 supported in said boss for rotary movement only and a nut 13a mounted on the said screw to travel along the same radially of said boss upon rotation of said screw. Said nut 13a is fast with the driving member or driving coupling arm 9 and upon a revolving motion of said screw the nut 13a and arm 9 will be caused to move along said screw and radially of said driving element and mold. Suitable means is provided for revolving the screw and, as shown, the screw 13 is provided with a head or nut 13' adapted to be engaged by the socket of a manually-operated handle 13b to permit rotation of the screw and to cause a radial travelling of the nut 13a and driving coupling arms 9.

As shown, the boss 12 and pulley are retained on the shaft 6 by a collar 6a seated on a reduced shaft portion 6' and fastened thereto by a set-screw 6b. In the preferred form shown, the collar 6a is set within a hollow or seat formed therefor in the boss 12 and a cover plate 12 is fastened to said boss to enclose the said collar 6a.

The forks 10 are preferably formed integrally with the mold and said two coupling members are so arranged as to enable a free movement of the arms 9 in the forks 10 of sufficient extent to permit the mold to rotate out of axial alignment with the driving element or pulley 8.

In apparatus of the type specified it is desirable to support the bucket at its free end when it has been moved into the mold and to hold the same firmly during its scraping operation, and in said preferred embodiment of my invention, I provide a stationary support for said free end of the bucket. Thus, the fixed shaft 6 is provided with a recess 14 adapted to receive a pivot 15 on the free end or extremity of the bucket 4 when the said bucket is moved to operative position within the mold, and this recess in the fixed or stationary shaft 6 will serve to support said free end of the bucket and to hold the bucket firmly during the scraping operation thereof and to maintain true axial alignment thereof.

Having described my invention, I claim:—

1. Apparatus for molding hollow bodies by centrifugal force embodying, in combination, a mold mounted for rotation, a driving element for said mold, means for rotating said driving element and coupling means for coupling said driving element to said mold comprising coupling members having a loose or floating connection whereby the mold and driving element are permitted to rotate with their axes out of alignment.

2. Apparatus for molding hollow bodies by centrifugal force embodying, in combination, a mold mounted for rotation, a driving element for said mold, means for rotating said driving element, and coupling means for coupling said driving element to said mold comprising a driving coupling member and a driven coupling member, one of said parts having a movement relatively to the other to form a loose or floating connection and to permit the mold and driving element to rotate with their axes out of alignment.

3. Apparatus for molding hollow bodies by centrifugal force embodying, in combination, a mold mounted for rotation, a driving element for said mold, means for rotating said driving element, and coupling means for coupling said driving element to said mold comprising a driving coupling member and driven coupling member, said driving coupling member having radial movement into and out of engagement with said driven coupling member.

4. Apparatus for molding hollow bodies by centrifugal force embodying, in combination, a mold mounted for rotation, a driving element for said mold, means for rotating said driving element, and coupling means for coupling said driving element to said mold comprising a coupling arm and a coupling fork, one of said coupling members having radial movement into and out of engagement with the other.

5. Apparatus for molding hollow bodies by centrifugal force embodying, in combination, a mold mounted for rotation, a driving element for said mold, means for rotating said driving element, and coupling means for coupling said driving element to said mold comprising a driving coupling arm and a driven coupling fork fast on the mold, said driving coupling arm being movable radially on said driving element into and out of engagement with said fork.

6. Apparatus for molding hollow bodies by centrifugal force embodying, in combination, a mold mounted for rotation, a driving element for said mold, means for rotating said driving element, coupling means for coupling said driving element to said mold comprising a driving coupling arm and driven coupling fork fast on the mold, and the driving arm being movable radially on said driving element into and out of engagement with said fork, and screw and nut mechanism for moving said driving coupling arm in a radial direction into and out of engagement with the driven coupling fork.

7. Apparatus for molding hollow bodies by centrifugal force embodying, in combination, a mold mounted for rotation, a bucket movable axially within said mold, driving means for said mold having a fixed shaft, a driving element mounted on said fixed shaft and having a driving connection with said mold, said fixed shaft being provide with means for supporting one end of the said bucket to hold the same firmly and in true axial alignment during the scraping operation while permitting rotation of the mold and its driving means with their axes out of alignment.

8. Apparatus for molding hollow bodies by centrifugal force embodying, in combination, a mold mounted for rotation, a bucket movable axially within said mold and having at its forward end a pivot, driving means for said mold having a fixed shaft provided with a recess adapted to receive the said pivot on the bucket, a driving element mounted on said fixed shaft and having a driving connection with said mold, said recessed fixed shaft being adapted to provide a stationary support for said bucket to hold the same firmly and in true axial alignment during the scraping operation while permitting rotation of the mold and its driving means with their axes out of alignment.

In witness whereof, I have signed my name to the foregoing specification.

RALPH ALEXANDER WHITSON.